(12) United States Patent
Lipinski

(10) Patent No.: US 8,132,742 B1
(45) Date of Patent: Mar. 13, 2012

(54) WINDSHIELD WIPER SPRAY NOZZLE OFFSET DEVICE

(76) Inventor: Daniel A. Lipinski, Waukesha, WI (US)

( * ) Notice: Subject to any disclaimer, the term of this patent is extended or adjusted under 35 U.S.C. 154(b) by 777 days.

(21) Appl. No.: 11/954,311

(22) Filed: Dec. 12, 2007

(51) Int. Cl.
*B60S 1/52* (2006.01)

(52) U.S. Cl. ............... 239/284.1; 15/250.04; 248/228.7; 248/231.81

(58) Field of Classification Search ........... 15/250.01, 15/250.04, 250.351, 250.23; 239/273, 280, 239/281, 280.5, 284.1, 531, 722, 282, 283, 239/284.2; 248/231.41, 231.81, 228.7
See application file for complete search history.

(56) References Cited

U.S. PATENT DOCUMENTS

| | | | |
|---|---|---|---|
| 1,448,508 A * | 3/1923 | Thum ..................... | 454/123 |
| 2,605,136 A * | 7/1952 | Kline et al. ............. | 239/282 |
| 2,866,996 A * | 1/1959 | Krusche ................ | 15/250.04 |
| 3,790,083 A * | 2/1974 | Redifer ................. | 239/284.1 |
| 3,793,666 A * | 2/1974 | Brillenburg Wurth ..... | 15/250.04 |
| 3,875,610 A * | 4/1975 | Wubbe et al. ........... | 15/250.351 |
| 3,940,068 A * | 2/1976 | Mohnach et al. ........ | 239/284.1 |
| 4,133,071 A * | 1/1979 | Jaske .................... | 15/250.04 |
| 5,842,251 A * | 12/1998 | LeFrançois et al. ...... | 15/250.04 |
| 5,987,695 A * | 11/1999 | Edele et al. ............ | 15/250.04 |
| 6,439,521 B1 * | 8/2002 | Wilson et al. ........... | 248/227.3 |
| 6,463,621 B1 | 10/2002 | Zimmer et al. | |
| 2007/0079463 A1 * | 4/2007 | Vandine ................ | 15/250.351 |

FOREIGN PATENT DOCUMENTS

GB 2047079 * 11/1980
JP 2007-62548 * 3/2007

* cited by examiner

*Primary Examiner* — Gary Graham
(74) *Attorney, Agent, or Firm* — Joseph S. Heino; Patrick M. Bergin

(57) ABSTRACT

A windshield wiper spray nozzle offset device includes an offset arm and an attachment device. The offset arm includes an offset leg extending from a clamping base. The attachment device is preferably a clamp plate and at least two fasteners. The at least two fasteners are preferably used to secure the clamping base and clamp plate to opposing sides of the wiper arm. However, other attachment devices may also be used, such as spring clips. The wiper arm may also be modified by making the offset arm as an integral portion of the wiper arm. A nozzle snap-on retainer and a hose snap-on retainer are removed from the wiper arm and snapped on to the offset leg. The offset position of the spray nozzle increases the spray area thereof.

3 Claims, 4 Drawing Sheets

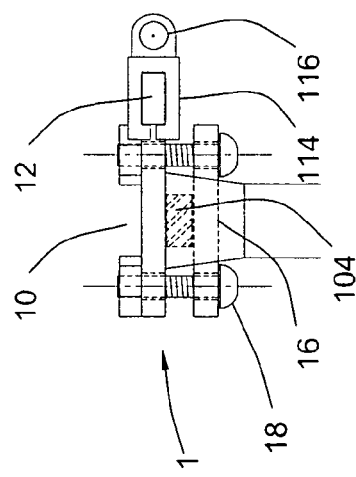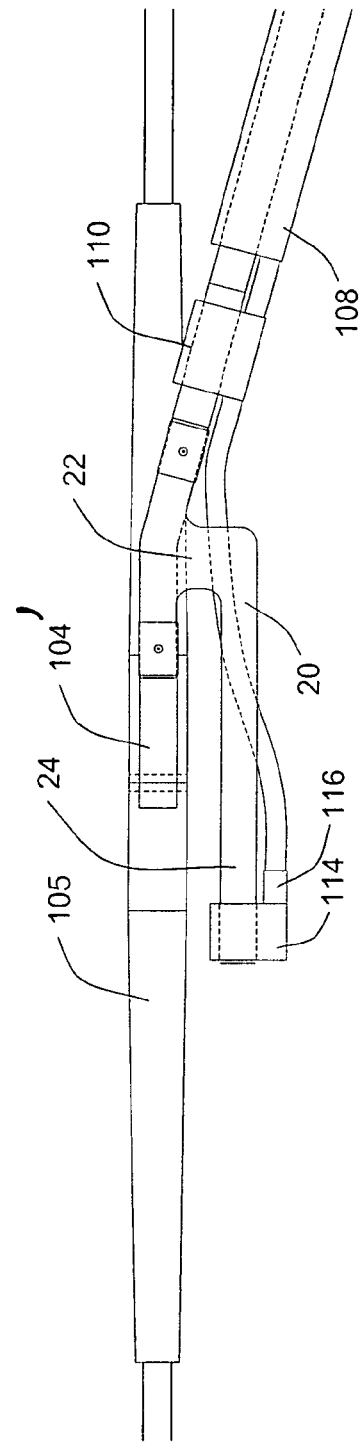

WINDSHIELD WIPER SPRAY NOZZLE OFFSET DEVICE

BACKGROUND OF THE INVENTION

1. Field of the Invention

The present invention relates generally to windshield wipers and more specifically to a windshield wiper spray nozzle offset device, which increases the spray area of a spray nozzle.

2. Discussion of the Prior Art

It appears that the prior does not teach or suggest locating a spray nozzle further away from a windshield wiper arm to improve the spray area thereof. However, the prior art does disclose alternative designs of spray nozzles.

Accordingly, there is a clearly felt need in the art for a windshield wiper spray nozzle offset device, which increases the spray area of a spray nozzle without modifying the design of the spray nozzle.

SUMMARY OF THE INVENTION

The present invention provides a windshield wiper spray nozzle offset device, which increases the spray area of a spray nozzle. The windshield wiper spray nozzle offset device (nozzle offset device) includes an offset arm and an attachment device. The offset arm includes an offset leg extending from a clamping base. The attachment device is preferably a clamp plate and at least two fasteners. At least two openings are formed through the clamping base and the clamp plate to receive the at least two fasteners. The clamping base is placed on a top of a blade retainer extension of a wiper arm and the clamp plate is placed on a bottom of the blade retainer extension. The at least two fasteners are used to secure the clamping base and clamp plate to the blade retainer extension. However, the attachment device may also be clips that extend from a clamping base and are sized to snap over the blade retainer extension. Other attachment devices may also be used.

A blade retainer extension may be modified to include an integral offset arm. The integral offset arm includes an offset portion and an offset leg. The offset leg is preferably substantially parallel to the modified blade retainer extension. The nozzle clip with the spray nozzle is attached to an end of the offset leg. A nozzle snap-on retainer is removed from the blade retainer extension and snapped on to the offset leg. The offset position of the nozzle increases the spray area of the spray nozzle.

Accordingly, it is an object of the present invention to provide a nozzle offset device, which increases the spray area of a spray nozzle without modifying the design of the spray nozzle.

These and additional objects, advantages, features and benefits of the present invention will become apparent from the following specification.

BRIEF DESCRIPTION OF THE DRAWINGS

FIG. 5 is an end view of an nozzle offset device attached to a wiper arm in accordance with the present invention.

FIG. 6 is a top view of a modified blade retainer extension with an offset leg as an integral portion thereof in accordance with the present invention.

DETAILED DESCRIPTION OF THE PREFERRED EMBODIMENTS

Figure 1:
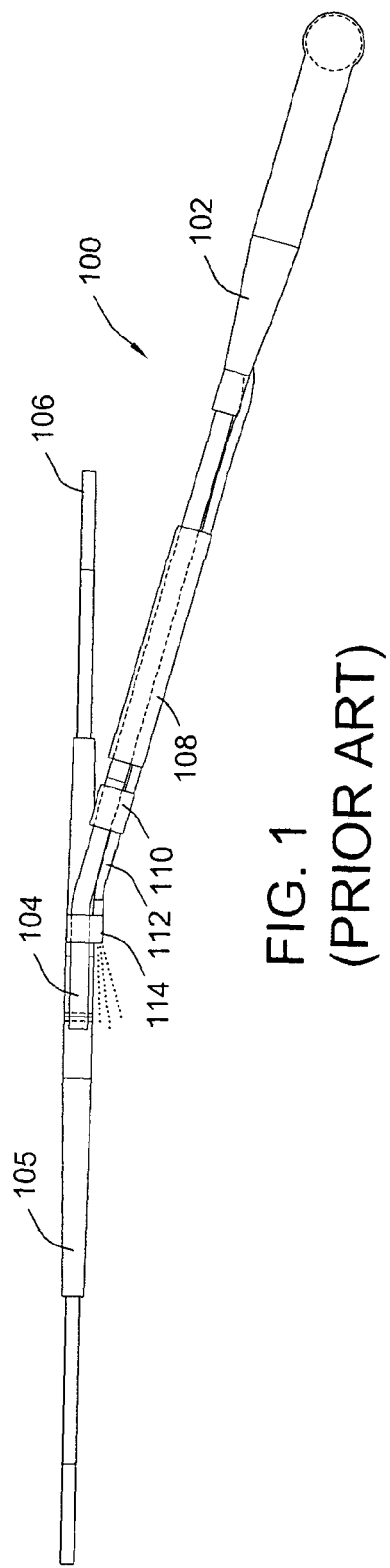
FIG. 1 is a top view of a prior art wiper arm.
Figure 2:
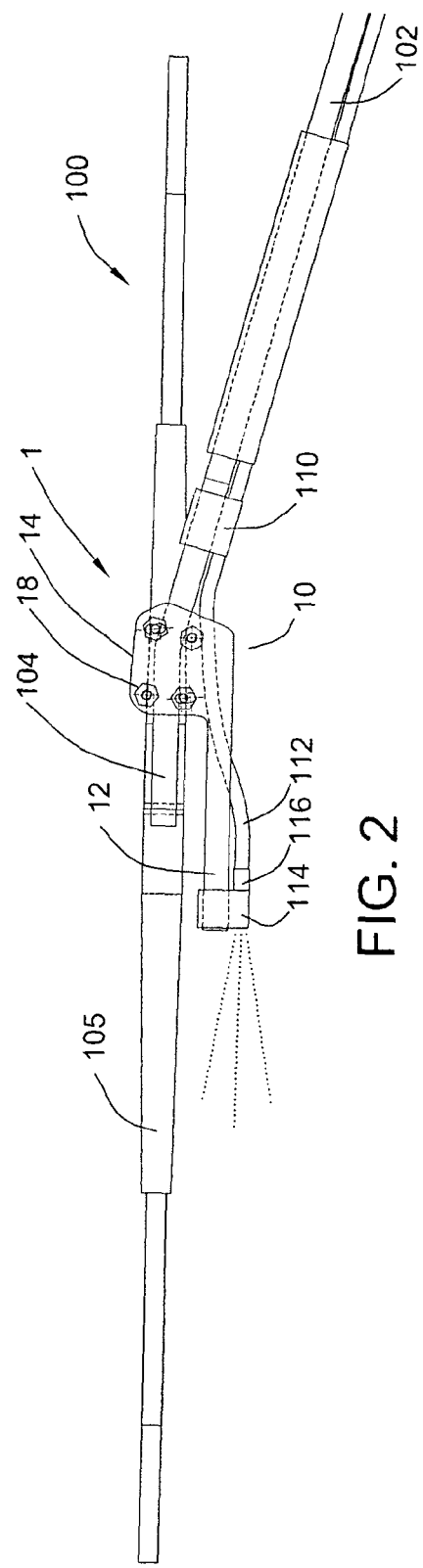
FIG. 2 is a top view of an nozzle offset device attached to a wiper arm in accordance with the present invention.

With reference now to the drawings, and particularly to FIG. 2, there is shown a top view of a nozzle offset device 1 attached to a blade retainer extension 104 of a wiper arm 102. FIG. 1 is a top view of the wiper assembly 100 without the nozzle offset device 1 attached thereto. The wiper assembly includes the wiper arm 102, the blade retainer extension 104, a blade retainer 105 and a wiper blade 106. The blade retainer extension 104 extends from an end of the wiper arm 102. The wiper arm 102 is retained by a pivoting assembly of a vehicle. A first hose clip 108 and a second hose clip 110 retain a fluid hose 112 on the blade retainer extension 104. A nozzle clip 114 retains a spray nozzle 116 on the blade retainer extension 104.

Figure 3:
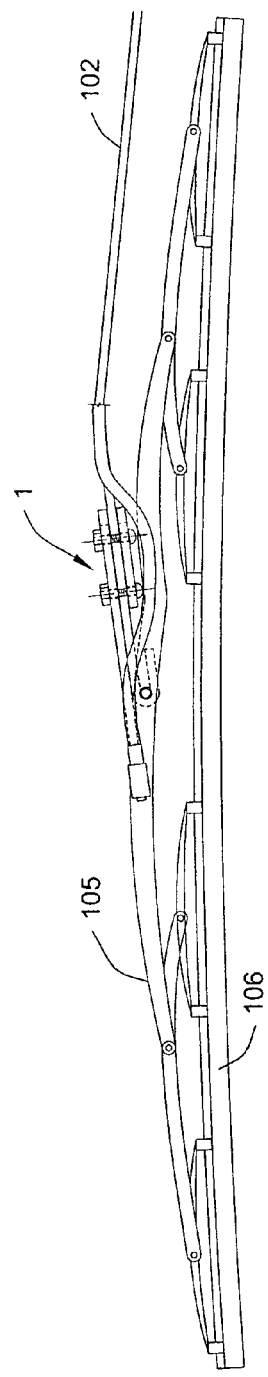
FIG. 3 is a side view of an nozzle offset device attached to a wiper arm in accordance with the present invention.
Figure 4:
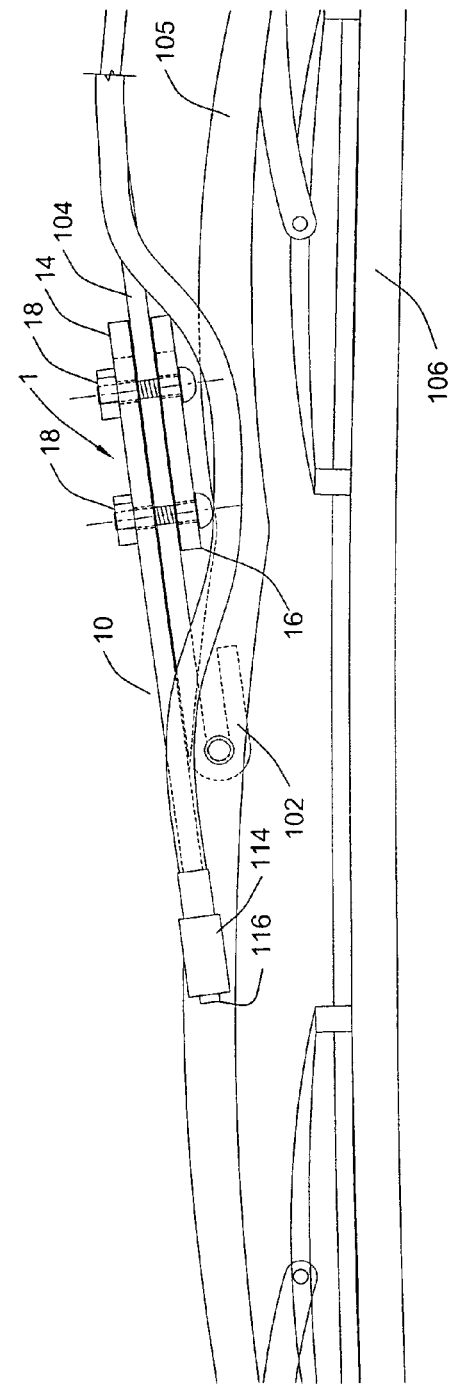
FIG. 4 is an enlarged side view of an nozzle offset device attached to a wiper arm in accordance with the present invention.

With reference to FIGS. 3-4, the nozzle offset device 1 includes an offset arm 10 and an attachment device. The offset arm 10 includes an offset leg 12 and a clamping base 14. The offset leg 12 extends from the clamping base 14. The attachment device is preferably a clamp plate 16 and at least two fasteners 18. At least two openings are formed through the clamping base 14 and the clamp plate 16 to receive the at least two fasteners 18. The clamping base 14 is placed on a top of the blade retainer extension 104 and the clamp plate 16 is placed on a bottom of the blade retainer extension 104. The at least two fasteners 18 are inserted through the at least two openings to secure the clamping base 14 and clamp plate 16 to the blade retainer extension 104. However, other attachment devices may also be used, such as snap clips.

The nozzle clip 114 is removed from the blade retainer extension 104 and snapped on to an end of the offset leg 12. The offset leg 12 preferably has the same width and thickness as an end of the blade retainer extension 104. The nozzle offset device 1 positions the spray nozzle 116, such that the spray area thereof is increased. The wiper assembly 100 does not have to be modified or altered for installation of the nozzle offset device 1.

With reference to FIG. 6, a blade retainer extension 104' is modified to include an integral offset arm 20. The integral offset arm 20 includes an offset portion 22 and an offset leg 24. The offset leg 24 is preferably substantially parallel to the blade retainer extension 104'. The nozzle clip 114 with the spray nozzle 116 is attached to an end of the offset leg 24.

Figure 7:
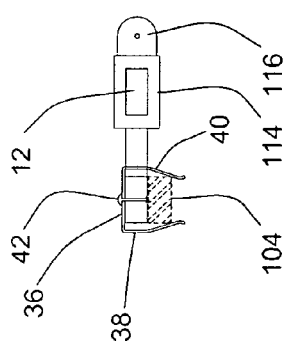
FIG. 7 is an end view of a second embodiment of a nozzle offset device attached to a wiper arm in accordance with the present invention.
Figure 8:
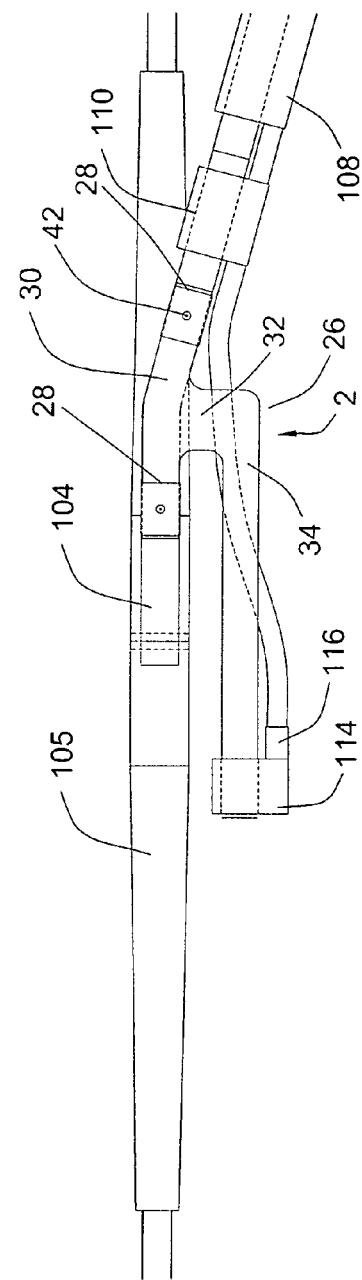
FIG. 8 is a top view of a second embodiment of a nozzle offset device attached to a wiper arm in accordance with the present invention.

With reference to FIGS. 7-8, a second embodiment of a nozzle offset device 2 includes an offset arm 26 and at least two spring clips 28. The offset arm 26 includes a clamping base 30, an offset portion 32 and an offset leg 34. One end of the offset portion 32 extends from a side of the clamping base 30. The offset leg 34 extends from the other end of the offset portion 32. Each spring clip 28 preferably includes a base 36, a first spring leg 38 and a second spring leg 40. The first spring leg 38 extends from one side of the base 36 and the second spring leg 40 extends from the other side of the base 36. A variable space between the first and second spring legs are sized to receive and retain blade retainer extension 104. A single spring clip 28 is attached to each end of the clamp base 30 with at least one rivet 42 or the like.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A windshield wiper spray nozzle offset device for use with a windshield wiper assembly, the windshield wiper assembly comprising a wiper arm having a first end retained by a pivoting assembly of a vehicle and a second end, a blade retainer extension operable to support a wiper blade being attached to the second end of the wiper arm and being set at an angle to the wiper arm, the windshield wiper spray nozzle offset device comprising:

an offset arm comprising a clamping base, the clamping base being defined by a first elongated portion and a second elongated portion set at an angle to the first elongated portion; an offset portion, the offset portion having a first end extending from the clamping base and a second end and an offset leg, the offset leg having a first end in contact with the second end of the offset portion, the offset leg having a second end extending in a direction substantially parallel to the first elongated portion of the clamping base;

a spring clip operable to secure the first elongated portion of the offset arm to the wiper arm;

a spring clip operable to secure the second elongated portion of the offset arm to the blade retainer extension of the wiper arm;

a nozzle;

a nozzle clip operable to secure the nozzle to the second end of the offset leg.

2. The windshield wiper spray nozzle offset device of claim 1 wherein the spring clip further comprises a base and a pair of spring legs extending outwardly therefrom and being angled towards one another.

3. The windshield wiper spray nozzle offset device of claim 1 wherein the spring clip is secured to the clamping base with a fastener.

\* \* \* \* \*